Figure 1:
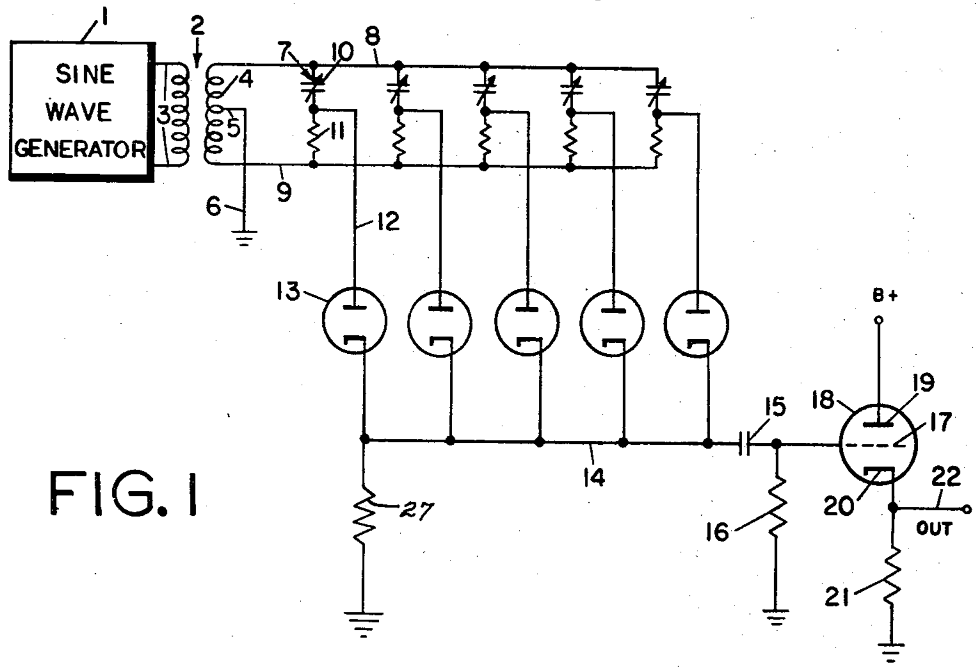
Figure 2:
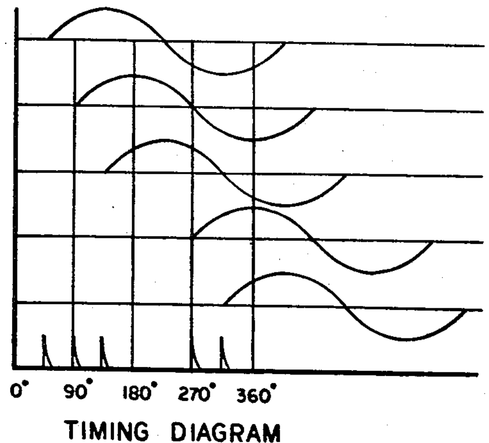
Figure 3:
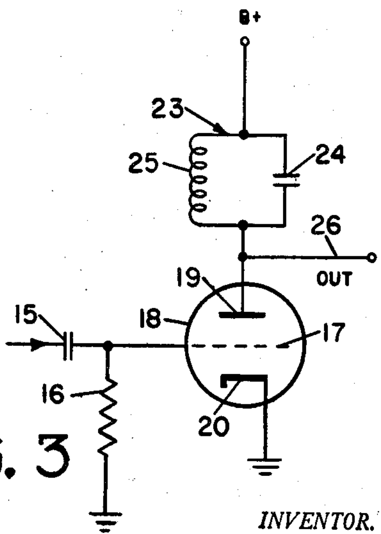

April 15, 1958 I. F. BARDITCH 2,831,108

SIGNAL GENERATORS

Filed Feb. 26, 1953

INVENTOR.
IRVING F. BARDITCH
BY Billy G. Corlew

United States Patent Office 2,831,108

Patented Apr. 15, 1958

2,831,108

SIGNAL GENERATORS

Irving F. Barditch, Baltimore, Md., assignor to Aircraft Armaments, Inc., Baltimore, Md., a corporation of Ohio Application February 26, 1953, Serial No. 338,995

6 Claims. (Cl. 250—27)

This invention relates in general to signal generators and more particularly to a pulse generator utilizing sine wave energy in a plurality of phase shifting networks to produce pulses at selective time intervals.

It is an object of this invention to provide a pulse generator which is readily adaptable for use as a pulse coder or as a frequency multiplier.

It is another object of this invention to provide a pulse generator having means for readily varying the pulse spacing.

It is still another object of this invention to provide a pulse generator which is light in weight and which is adaptable to compact packaging such as is required for aircraft uses.

Further and other objects will become apparent from a reading of the following detailed description when considered in combination with the accompanying drawing wherein like numerals refer to like parts.

In the drawing:

Figure I is a schematic circuit diagram of the pulse generator of this invention.

Figure II is a timing diagram illustrating the operation of the pulse generator circuit shown in Figure I.

Figure III shows a modification for the circuit shown in Figure I.

As shown in Figure I, sine wave energy produced by a sine wave generator 1 is applied to a transformer 2 through leads 3. Secondary coil 4 of transformer 2 is provided with a center tap 5 which is connected to ground through lead 6. A plurality of variable phase shifting networks 7 are arranged in a parallel circuit and connected to the opposite ends of secondary coil 4 through leads 8 and 9 so as to receive the sine wave energy produced by the signal generator.

Variable phase shifting networks 7 each include a variable condenser 10 and a resistor 11 arranged in series so that by varying the capacity of the condenser, the phase of the sine wave energy is likewise varied. Phase shifting up to 360 degrees may be accomplished in this manner. The output from the phase shifting networks 7 is obtained through individual leads 12 connecting with each network between the condenser and resistor. A plurality of diode rectifiers 13, one for each phase shifting network, connect with output leads 12 for rectifying the phase shifted sine wave energy. The rectified sine wave outputs from diodes 13 are fed through a common lead 14 so that the rectified outputs will all be applied to a single differentiating circuit such as shown in Figure I wherein a conventional condenser 15 resistor 16 combination is employed. A resistor 27 connecting lead 14 to ground provides a discharge path for condenser 15. By differentiating the rectified sine wave outputs from diodes 13, pulses are produced which appear at the leading edge of each rectified sine wave as indicated in the timing diagram of Figure II. The pulses obtained by differentiation are applied to the grid 17 of a triode vacuum tube 18 for amplification and shaping. Anode 19 of tube 18 is connected to B+ while the cathode 20 is connected to ground through resistor 21. The amplified pulse output is obtained through lead 22 connecting with cathode 20.

In the operation of the pulse generator, sine wave energy is applied to center tapped transformer 2 connecting with the plurality of phase shifting networks 7. The desired phase shift is effected in networks 7 by adjusting condensers 10 until the sine wave outputs are delayed in time as desired to produce the proper output pulse spacing. The phase shifted sine wave energy is rectified by diodes 13 and then differentiated by the condenser 15 resistor 16 combination so that each time a sine wave appears in line 14 a pulse will be produced. The pulses are then amplified in tube 18 to provide the desired pulse output.

When used as a pulse coder, the sine wave energy applied to the generator must have a wave length at least as great as the maximum desired code duration since effective phase shifting is limited to 360 degrees. As many code pulses as desired, within the time span of one sine wave, may be produced by simply providing a phase shifting network for each of the pulses desired in the code. If fewer pulses are desired in the code than the number of phase shifting networks built into the pulse generator it is only necessary to adjust several of the networks to produce like phase shifts wherein only one sine wave will appear for the several networks. The spacing between the individual pulses may be readily changed to conform to different codes. The latter feature is important for use in missile guidance systems, for example, since it permits employing different codes for different missiles making it more difficult to ascertain the code system.

Figure III shows a modification for the circuit shown in Figure I wherein the pulse generator serves as a frequency multiplier. A conventional tuned circuit 23 consisting of a condenser 24 and coil 25 is inserted between anode 19 of tube 18 and B+. Cathode 20 connects directly with ground. When pulses are applied to grid 17 causing current to flow in tube 18 tuned circuit 23 will "ring" at the designed resonant frequency to produce a sine wave at the output 26 which will be at a harmonic frequency greater than the frequency of the input sine wave by an amount proportional to the number of phase shifting networks as shown in Figure I in the pulse generator when the networks are adjusted to provide equal increments of phase shifting from 0° to 360°. For example, with five phase shifting networks as shown in Figure I the frequency will be five times the frequency of the input sine wave. This provides a simpler way of effecting frequency multiplication than is possible with conventional circuits.

It is to be understood that certain alterations, modifications and substitutions may be made to the instant disclosure without departing from the spirit and scope of the invention as defined by the appended claims.

I claim:

1. A code pulse generator comprising, means generating input sine wave energy having a wavelength at least as great as the maximum desired code duration, a plurality of independently variable phase shifting networks arranged in parallel and connected to said sine wave generating means for producing a plurality of sine waves in response to each input sine wave, each of the plurality of sine waves being delayed in time by an amount proportional to the amount of phase shift of the respective network, rectifiers connected to each said phase shifting network for rectifying the phase shifted sine wave output therefrom, and differentiating means connected to the rectifier outputs and responsive to the rectified sine waves for producing code pulses spaced apart in accordance with the amount of phase shift introduced by said phase shifting networks.

2. A pulse generator comprising, a source of sine wave energy, a plurality of independently variable phase shifting networks arranged in parallel, transformer means connecting said phase shifting networks to said source of sine wave energy to produce a plurality of phase shifted sine waves, rectifiers connected to each said phase shifting network for rectifying the phase shifted sine wave output, and differentiating means connected to the rectifier outputs and responsive to the rectified sine waves for producing pulses spaced apart in accordance with the setting of said phase shifting networks.

3. A code pulse generator comprising, means generating sine wave energy having a wavelength greater than the maximum desired code duration, a plurality of independently variable electrical phase shifting networks arranged in parallel, said networks each consisting of capacitive and resistive elements connected in series, a center tapped transformer connecting said phase shifting networks to said sine wave generating means to produce a plurality of phase shifted sine waves in response to every sine wave from the generating means, rectifiers connected to each said phase shifting network between said capacitive and resistive elements for rectifying the phase shifted sine wave output therefrom, and a differentiator connected to the outputs of said rectifiers for producing pulses in response to the rectified sine waves.

4. A signal generator comprising, a source of sine wave energy, a plurality of independently variable phase shifting networks arranged in parallel and connected to said source of sine wave energy and producing a plurality of sine waves in response to each sine wave from said source delayed in time relative thereto in accordance with the amount of phase shift, rectifiers connected to each said phase shifting network for rectifying the phase shifted sine wave output therefrom, differentiating means connected to said rectifiers and responsive to the rectified sine waves for producing a plurality of pulses spaced apart in accordance with the amount of phase shift introduced by said phase shifting networks, and amplifying means connected to said differentiating means and responsive to said pulses for producing the desired output signal.

5. A signal generator for frequency multiplication comprising, a source of sine wave energy to be frequency multiplied, a plurality of independently variable phase shifting networks arranged in parallel and connected to said source of sine wave energy to produce a plurality of sine waves in response to each sine wave from said source delayed in time relative thereto in accordance with the amount of phase shift, rectifiers connected to each said phase shifting network for rectifying the phase shifted sine wave output therefrom, differentiating means connected to said rectifiers and responsive to the rectified sine waves for producing a plurality of pulses spaced apart in accordance with the amount of phase shift introduced by said phase shifting networks, and a tuned amplifier connected to said differentiating means and responsive to said pulses for producing a sine wave output at a harmonic frequency greater than the frequency of said sine wave energy from said source.

6. A code pulse generator comprising, a source of alternating current, a plurality of parallel connected phase shifting networks, each comprising an independently variable condenser and a resistor connected in series, a transformer coupling said alternating current source to said phase shifting networks, a rectifier connected to the output of each said phase shifting network, and differentiating means connected to said rectifiers to produce voltage pulses in response to the output thereof, whereby to produce, for each cycle of said alternating current source, a group of output pulses spaced in accordance with the amount of phase shift introduced by each said network.

References Cited in the file of this patent

UNITED STATES PATENTS

| | | |
|---|---|---|
| 2,195,853 | Fitch | Apr. 2, 1940 |
| 2,227,906 | Kellogg | Jan. 7, 1941 |
| 2,266,668 | Tubbs | Dec. 16, 1941 |
| 2,408,193 | Best | Sept. 24, 1946 |
| 2,414,541 | Madsen | Jan. 21, 1947 |
| 2,470,028 | Gordon | May 10, 1949 |
| 2,521,952 | Stephenson | Sept. 12, 1950 |
| 2,522,368 | Guanella | Sept. 12, 1950 |
| 2,574,207 | Christian | Nov. 6, 1951 |
| 2,594,535 | Bertram | Apr. 29, 1952 |
| 2,693,534 | Bertram | Nov. 2, 1954 |